Aug. 9, 1932.   C. A. DOMZALSKI   1,870,716
MOTOR VEHICLE TESTING APPARATUS
Filed Dec. 10, 1931   3 Sheets-Sheet 3
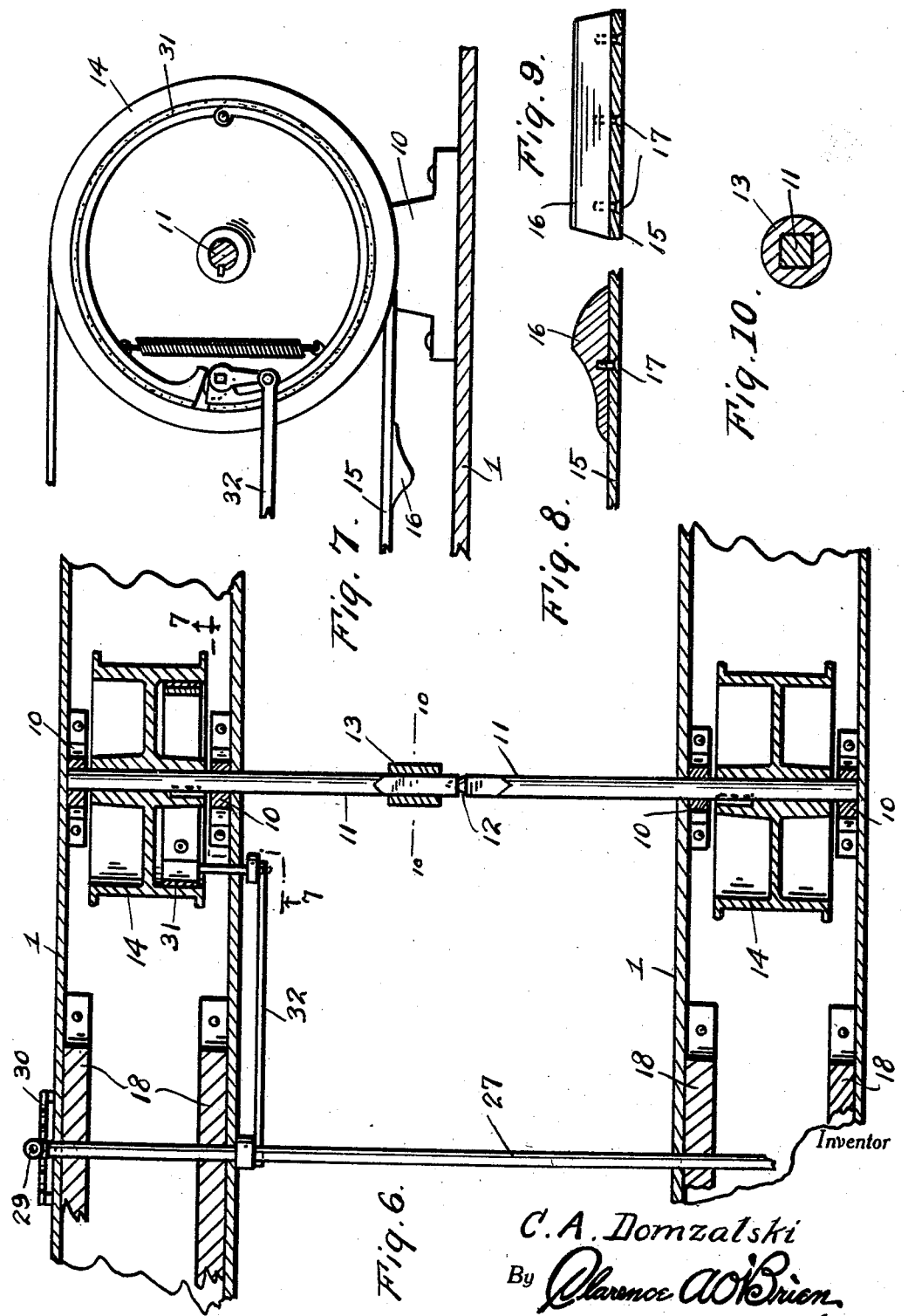

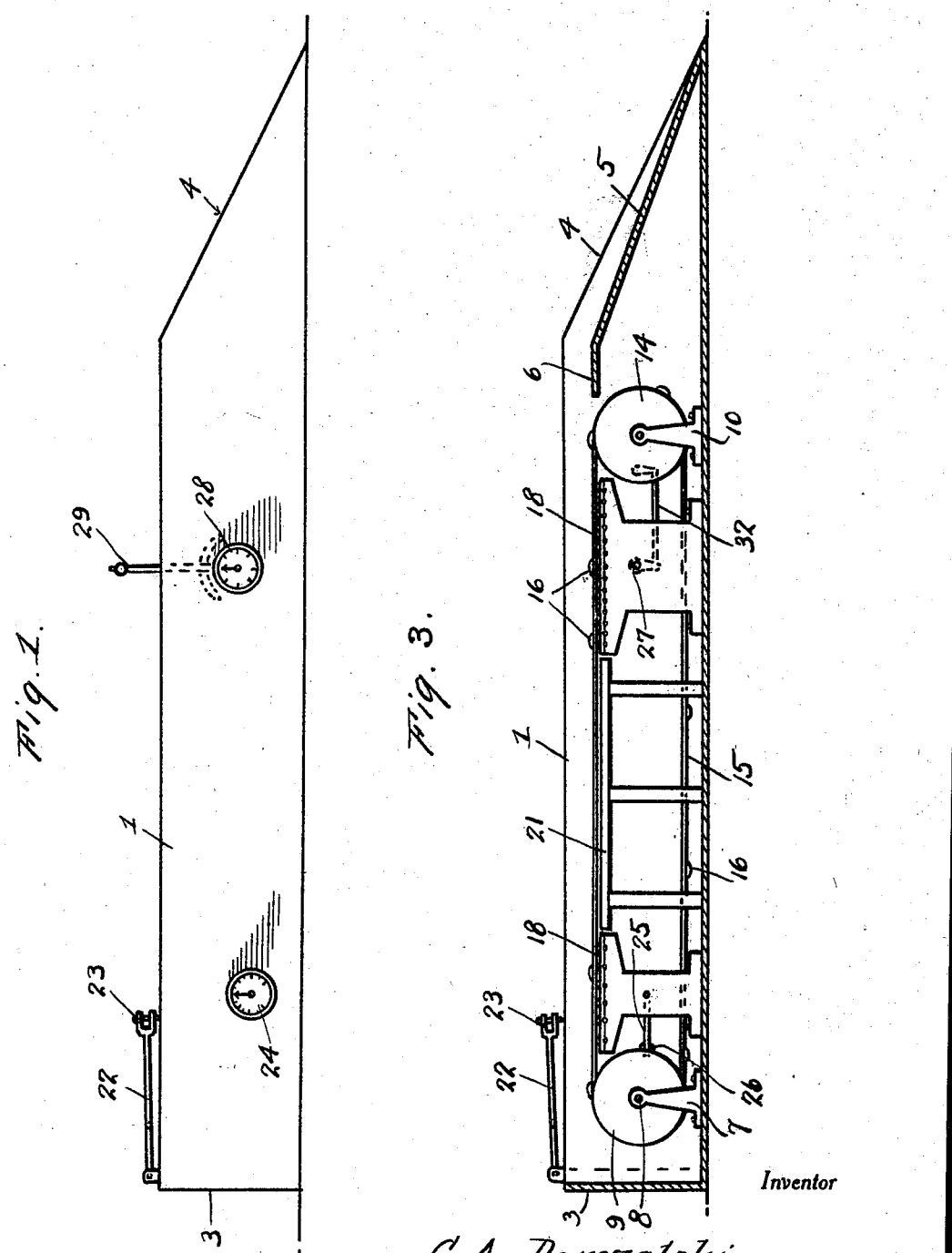

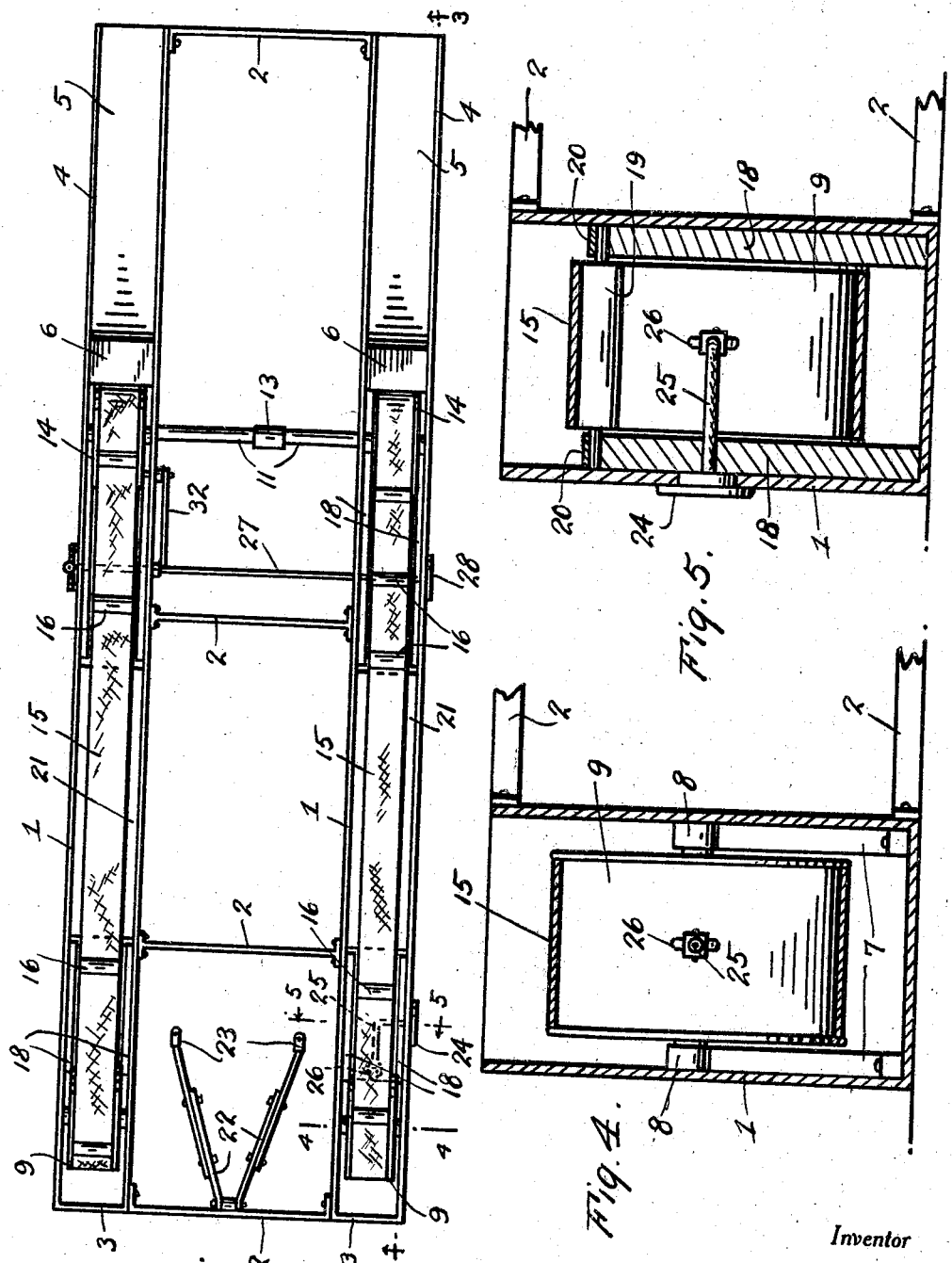

Patented Aug. 9, 1932

1,870,716

UNITED STATES PATENT OFFICE

CASIMIR A. DOMZALSKI, OF DETROIT, MICHIGAN

MOTOR VEHICLE TESTING APPARATUS

Application filed December 10, 1931. Serial No. 580,191.

The present invention relates to a motor vehicle testing apparatus and has for its primary object to provide, in a manner as hereinafter set forth, an apparatus of this character comprising a novel construction, combination and arrangement of parts through the medium of which a motor vehicle may be conveniently subjected to treatment closely simulating conditions which are met with in actual use, thereby facilitating the locating of squeaks and rattles, the adjustment of shock absorbers, etc.

Another important object of the invention is to provide a motor vehicle testing apparatus of the character set forth embodying means through the medium of which the speedometer of said vehicle may be tested without the necessity of disconnecting said speedometer.

Another important object of the invention is to provide a testing apparatus embodying means for braking the drive wheels of the vehicle to any desired extent, thereby putting a load on the engine of the vehicle as would occur when ascending a hill.

Other objects of the invention are to provide a motor vehicle testing apparatus of the character described which will be simple in construction, strong, durable, efficient and reliable in use and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:—

Figure 1 is a view in side elevation of a motor vehicle testing apparatus in accordance with the present invention.

Figure 2 is a view in top plan of the apparatus.

Figure 3 is a view in vertical longitudinal section taken substantially on the line 3—3 of Figure 2 looking in the direction indicated by the arrows.

Figure 4 is a view in vertical transverse section taken substantially on the line 4—4 of Figure 2.

Figure 5 is a view in vertical transverse section taken substantially on the line 5—5 of Figure 2, looking in the direction indicated by the arrows.

Figure 6 is a fragmentary view in horizontal section through a rear portion of the apparatus.

Figure 7 is a vertical longitudinal sectional view taken substantially on the line 7—7 of Figure 6, looking in the direction indicated by the arrows.

Figure 8 is a view in vertical longitudinal section through a portion of one of the endless belts showing thereon, also in vertical longitudinal section, a detachable block.

Figure 9 is a detail view in vertical transverse section through one of the endless belts showing thereon a detachable block.

Figure 9 is a detail view in vertical section taken substantially on the line 10—10 of Figure 6.

Referring now to the drawings in detail, it will be seen that the embodiment of the invention illustrated comprises a pair of channel members which are secured together in spaced parallelism by suitable bars 2. The forward ends of the channel members 1 are closed and provided with vertical end walls 3 while the rear ends of the channel members are inclined, as at 4. Mounted in the rear end portions of the channel members 1 are the inclined runways 5 which terminate, at their upper ends, in the horizontal portions 6.

Pairs of standards 7 are mounted vertically in the forward end portions of the channel members 1 against the side walls of said channel members and said standards are provided with bearings 8 at their upper ends in which the supporting shafts of the flanged pulleys 9 are journaled. Pairs of standards 10, similar to the standards 7 are mounted in rear portions of the channel members 1 and are likewise provided with bearings at their upper ends in which are journaled the shafts 11. The shafts 11 extend through the inner side walls of the channel members 1 and one of said shafts is provided with a socketed inner end for the reception of the bearing point 12 (see Figure 6) on the corresponding end of the other shaft 11. Thus, the shafts 11 are connected at their inner ends for rotation independently of each other. The inner end portions of the shafts 11 are of polygonal cross section and slidable thereon is a coupling sleeve 13 which, when it bridges the inner end portions of the shafts, locks said shafts together for rotation in unison. Of course, when the sleeve 13 is slid entirely on to one of the shafts 11, said shafts may rotate independently of each other.

Fixed on the shafts 11 in the channel members 1 are the flanged pulleys 14 of the cross sectional shape illustrated to advantage in Figure 6 of the drawings. The pulleys 14 are spaced forwardly a slight distance from the forward ends of the horizontal portions 6 of the runways 5. Trained over the longitudinally aligned pulleys 9 and 14 are the endless belts 15, the upper flights of which are located below the tops of the channel members. Blocks 16 are detachably secured at spaced points on the belts 15 by suitable means, such as screws 17. Any desired number of the blocks 16 may be provided on each belt and said blocks may be of any suitable shape. The blocks 16 simulate obstructions or bumps in a highway when the apparatus is in use. Of course, when certain tests are being made, all of the blocks 16 may be removed if the use thereof is not desired.

Also mounted in the channel members 1 between the pulleys 9 and 14 and adjacent said pulleys are the elongated standards 18 which are provided in pairs, each pair supporting thereon a series of rollers 19 engaged beneath the upper flights of the belts 16. Suitable retaining means 20 is provided on top of the standards 18 for retaining the series of rollers 19 in position. The series of rollers 19 provide positive supports for the portions of the belts 15 upon which the wheels of the vehicle being tested rest. The series of rollers are of sufficient length to accommodate vehicles of different wheel bases. Intermediate the series of rollers 19, the upper flights of the belts 15 pass over the platforms 21 which are provided therefor in the channel members 1. The platforms 21 support the belts when the front wheels of a vehicle which is being driven onto or off the apparatus pass over the adjacent portion of the upper flights of the belts.

Extensible arms 22 are mounted for swinging movement in a vertical plane on the forwardmost upper connecting bar 2 and clamps 23 of suitable construction are provided on the free ends of said extensible arms for connection with the front axle of the vehicle being tested to retain said vehicle against forward or reverse movement at all times.

The speedometer 24 is mounted in the outer side of one of the channel members 1 and is operatively connected by a flexible shaft extending through a conduit 25 to a drive wheel 26 (see Figure 5) for actuation thereby. The drive wheel 26 is frictionally engaged with the outer periphery of the pulley 9 in said one channel member to be actuated by said pulley 9. As will be apparent, the speedometer 24 provides means for readily determining at what speed the belts 15 are being driven by the vehicle being tested and in this way the speedometer of said vehicle may be readily checked.

Journaled transversely in the channel members 1 and extending through the rear standards 18 is a shaft 27 to one end of which is operatively connected an indicator 28. The indicator 28 is mounted on the same side of the apparatus as the speedometer 24. Fixed on the other end of the shaft 27 and located adjacent the other side of the apparatus is an operating lever 29 having a suitable latch means thereon engageable with a toothed segment 30 for releasably securing the lever, and consequently the shaft 27 in adjusted position. A friction brake 31 is mounted in one of the pulleys 14 and operatively engageable therewith. The brake 31 is connected to the shaft 27 for actuation thereby through the medium of suitable means including the rod 32.

In use, the vehicle is driven on to the apparatus with the wheels resting on the belts 15 at the points where said belts are supported by the series of rollers 19. The arms 22 are secured to the front axle of the vehicle through the medium of the clamps 23 and then, when the drive wheels of the vehicle are rotated, the belts 15 will be driven thereby and, of course, rotate the pulleys 9 and 14. As before explained, the blocks 16 simulate obstructions or bumps in a highway and when passing beneath the wheels of the vehicle, said blocks will shake the vehicle and facilitate the locating and eliminating of squeaks and rattles therein. Also, the shaking of the vehicle by the blocks 16 facilitates the proper adjustment of the shock absorbers of the vehicle. By comparing the speedometer of the vehicle with the speedometer 24, said vehicle speedometer may be checked. Through the medium of the brake 31 the engine of the vehicle may be put under various loads as when the vehicle is ascending hills and in this manner defects in the mechanism, such as in the transmission and differential, and also knocks or other defects in the engine which may be present will be accentuated and easily located. The indicator 28 shows the load which the engine is pulling. When the shafts 11 are disconnected, as seen in Figure 6 of the drawings, the belts 15 may move at different speeds or, one of the belts may be held stationary if desired while the other is driven by one drive wheel of the vehicle. Obviously, when the shafts 11 are connected by the sleeve 13, the belts 15 must operate in unison.

It is believed that the many advantages of a motor vehicle testing apparatus constructed in accordance with the present invention will be readily understood, and although the preferred embodiment of the invention is as illustrated and described, it is to be understood that changes in the details of construction and in the combination and arrangement of parts may be resorted to which will fall within the scope of the invention as claimed.

What is claimed is:—

1. A motor vehicle testing apparatus comprising spaced, parallel channel members, spaced pulleys mounted for rotation in the channel members, endless belts trained over the pulleys for supporting the vehicle and for actuation by the drive wheels of said vehicle, spaced pairs of standards mounted in the channel members between the pulleys, series of rollers journaled on each pair of standards engageable beneath the upper flights of the belts for supporting said belts beneath the weight of the vehicle wheels, and platforms in the channel members between the spaced pairs of standards and engageable beneath the intermediate portions of the upper flights of the belts for supporting said intermediate portions when the wheels of the vehicle roll thereover.

2. A motor vehicle testing apparatus comprising spaced, parallel channel members, bars securing the channel members together in spaced relation, pairs of standards in the end portions of the channel members, shafts journaled in the pairs of standards, flanged pulleys mounted on the shafts for rotation in the channel members, endless belts trained over the pulleys and operable longitudinally in the channel members, said belts adapted to support the vehicle and being driven by the drive wheels of said vehicle, pairs of elongated standards mounted in the channel members in spaced relation and between the pulleys, series of rollers journaled in each pair of elongated standards and engageable beneath the upper flights of the belts at spaced points for supporting said belts beneath the weight of the vehicle wheels, platforms mounted in the channel members between the pairs of elongated standards and engageable beneath the upper flights of the belts for supporting intermediate portions of said upper flights when the vehicle wheels roll thereover, and means for releasably securing the vehicle against forward or rearward movement relative to the apparatus.

3. A motor vehicle testing apparatus comprising spaced, parallel channel members, bars securing the channel members together in spaced relation, pairs of standards in the end portions of the channel members, shafts journaled in the pairs of standards, flanged pulleys mounted on the shafts for rotation in the channel members, endless belts trained over the pulleys and operable longitudinally in the channel members, said belts adapted to support the vehicle and being driven by the drive wheels of said vehicle, pairs of elongated standards mounted in the channel members in spaced relation and between the pulleys, series of rollers journaled in each pair of elongated standards and engageable beneath the upper flights of the belts at spaced points for supporting said belts beneath the weight of the vehicle wheels, platforms mounted in the channel members between the pairs of elongated standards and engageable beneath the upper flights of the belts for supporting intermediate portions of said upper flights when the vehicle wheels roll thereover, and means for releasably securing the vehicle against forward or rearward movement relative to the apparatus, said means including a pair of sectional, extensible arms pivotally connected, at one end, for swinging movement in a vertical plane on one of the bars, and clamps on the free ends of the arms for connection with the front axle of the vehicle.

4. A motor vehicle testing apparatus comprising spaced, parallel channel members, a pair of transversely aligned shafts journaled in the channel members and having their inner ends adjacent each other, means for releasably securing the shafts together for rotation in unison, pulleys fixed on the shafts and operable in the channel members, pulleys mounted for rotation in the channel members in spaced relation to the first named pulleys, and endless belts operable in the channel members and trained over the pulleys, said belts being adapted to support the vehicle and being actuated by the drive wheels of said vehicle.

In testimony whereof I affix my signature.

CASIMIR A. DOMZALSKI.